United States Patent [19]

Lee et al.

[11] Patent Number: 4,815,130
[45] Date of Patent: Mar. 21, 1989

[54] STREAM CIPHER SYSTEM WITH FEEDBACK

[75] Inventors: Lin-Nan Lee, Potomac; Neal D. Becker, Thurmont, both of Md.

[73] Assignee: Communications Satellite Corporation, Washington, D.C.

[21] Appl. No.: 97,307

[22] Filed: Sep. 14, 1987

Related U.S. Application Data

[63] Continuation of Ser. No. 914,572, Oct. 3, 1986, abandoned, which is a continuation of Ser. No. 586,388, Mar. 5, 1984, abandoned.

[51] Int. Cl.$^4$ .............................................. H04L 9/04
[52] U.S. Cl. ........................................ 380/50; 380/37; 380/42; 380/43
[58] Field of Search ...................... 380/37, 49, 50, 42, 380/43

[56] References Cited

U.S. PATENT DOCUMENTS

| | | | |
|---|---|---|---|
| 3,071,649 | 1/1963 | Goodall | 380/41 |
| 3,654,604 | 4/1972 | Crafton | 380/24 |
| 3,688,193 | 9/1972 | McDonald | 380/44 |
| 3,925,612 | 12/1975 | Guanella et al. | 380/50 |
| 4,152,545 | 5/1979 | Gilbreath et al. | 380/50 |
| 4,157,454 | 6/1979 | Becker | 178/22.12 |
| 4,255,811 | 3/1981 | Adler | 380/43 |
| 4,304,962 | 12/1981 | Fracassi et al. | 178/22.19 |
| 4,316,055 | 2/1982 | Feistel | 380/43 |
| 4,434,322 | 2/1984 | Ferrell | 380/50 |
| 4,447,672 | 5/1984 | Nakamura | 178/22.19 |
| 4,663,500 | 5/1987 | Okamoto et al. | 380/50 |

*Primary Examiner*—Salvatore Cangialosi
*Attorney, Agent, or Firm*—Sughrue, Mion, Zinn, Macpeak & Seas

[57] ABSTRACT

A cipher system in which a key is initially inserted into a shift register and the serial output of the shift register is added to the plain text message and the sum is fed back into the serial input of the shift register. Parallel outputs of the shift register are led to a logic function which transforms the multiple inputs into a single output, the value of which is evenly distributed among the possible combinations on the input. The logic function output is then added to the message to produce the enciphered message. In the decipherer, the deciphered message is added to the serial output of the shift register to produce the serial input to the shift register. Otherwise, the decipherer closely resembles the encipherer.

11 Claims, 3 Drawing Sheets

U.S. Patent  Mar. 21, 1989  Sheet 1 of 3  4,815,130
FIG.1A PRIOR ART
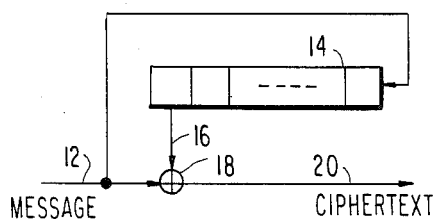
FIG.1B PRIOR ART
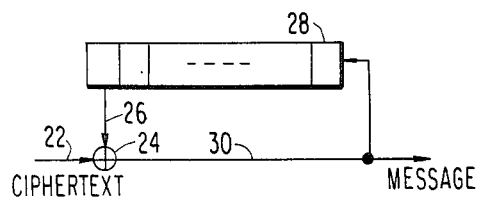
FIG.2A PRIOR ART
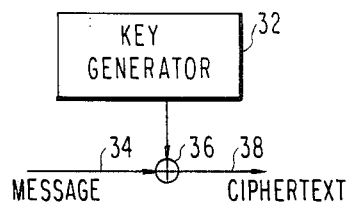
FIG.2B PRIOR ART
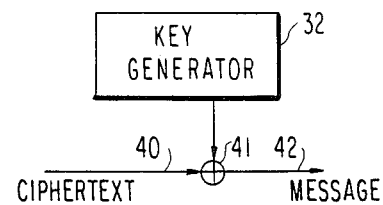
FIG.3 PRIOR ART
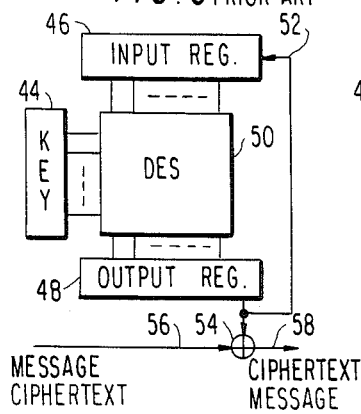
FIG.4A PRIOR ART
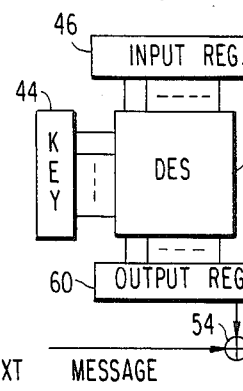
FIG.4B PRIOR ART
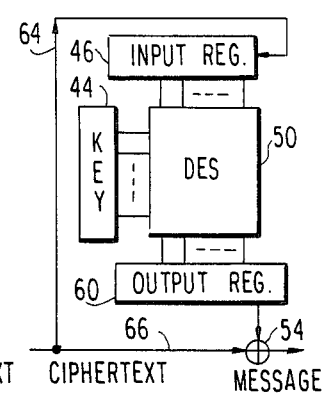
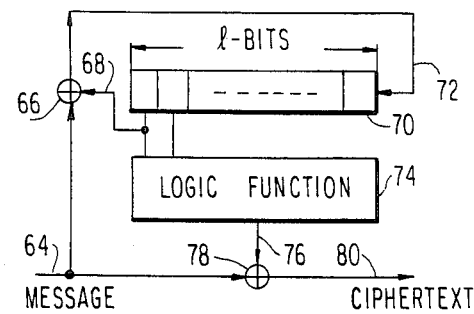
FIG.5A
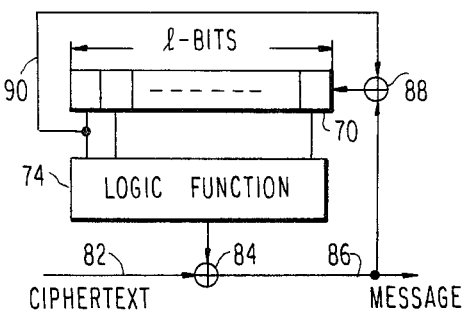
FIG.5B

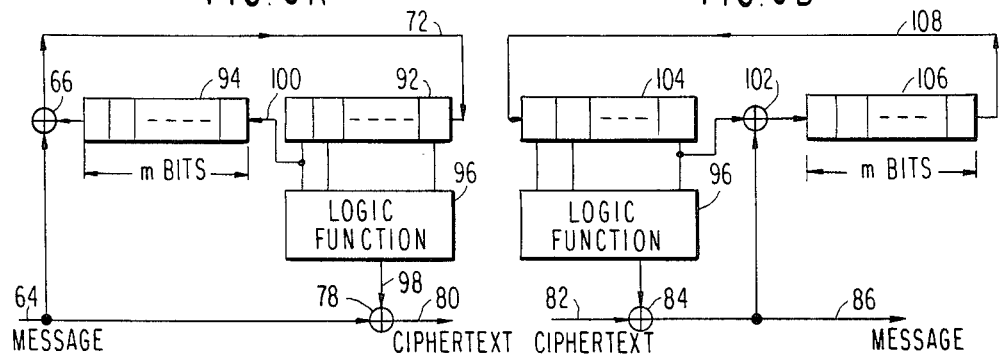
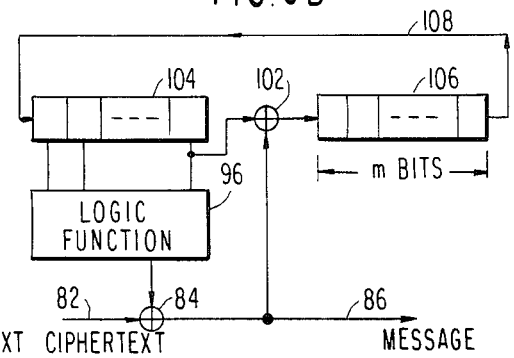
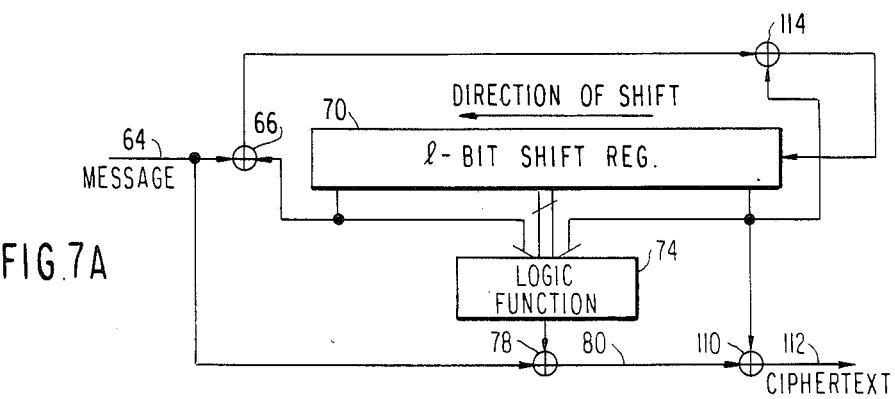
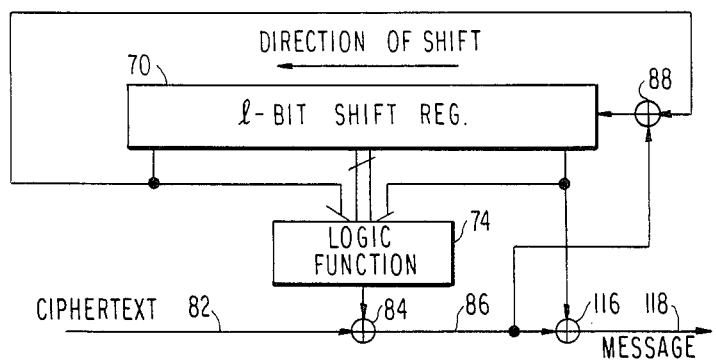
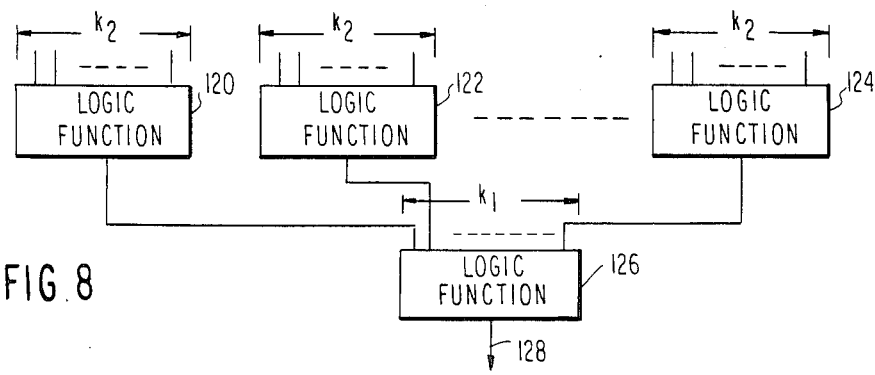

STREAM CIPHER SYSTEM WITH FEEDBACK

This is a continuation, of application Ser. No. 914,572 filed Oct. 3, 1986 now abandoned which is a continuation of application Ser. No. 586,388 filed Mar. 5, 1984 now abandoned.

BACKGROUND OF THE INVENTION

The invention relates generally to a cipher system, and it relates, in particular, to a stream cipher system employing feedback and a logic function.

Cipher systems are used to encode data for transmission in such a way that an unintended recipient of the transmission cannot decipher nor understand the message contained in the transmission without an understanding of the details of the enciphering system and possibly also a key employed in the enciphering. In this way proprietary or highly sensitive data can be transmitted over common airways. These transmissions are themselves understood to involve unsecure data paths which can be easily intercepted by unintended recipients. However, if these recipients cannot perform the required deciphering to reproduce the original data, the security of the system can be maintained.

Many types of cipher systems are widely known and have been described in the open literature. Cipher systems are generally divided into two classes, block ciphers and stream ciphers. A block cipher operates upon a multi-bit block to transform the bit sequence within the block into another sequence having possibly a different block size. However, the blocks remain independent of each other. In contrast, a stream cipher individually changes each bit in a generally infinite stream. In the general case of a stream cipher, the transformation of a particular bit may depend upon the values of neighboring bits but there is no defined block. One type of stream cipher is the auto-key cipher shown schematically in FIGS. 1A and 1B. FIG. 1A illustrates the basic operation of the encipherer. A digital message arrives in plain text, that is, in unenciphered form, on an input line 12 which is connected to the serial input of a shift register 14. The shift register 14 shifts to the left, as illustrated, in synchronism with the bit rate of the input line 12. If the shift register 14 is m bits long, then after m periods of the message, the input appears on the output 16 of the shift register. This delayed bit is then added bit by bit in an adder 18 to the current bit of the message to produce a cipher text on the output 20 of the encipherer.

The design of the decipherer, as illustrated in FIG. 1B, closely resembles that of the encipherer. The cipher text is received on an input line 22 and is added in an adder 24 to the output 26 of an m-bit shift register 28 to produce the deciphered text or message on an output line 30. A binary adder 24 acts as well as a subtractor. The deciphered text is also led into the input of the shift register 28 where it reappears m bits later on the output 26.

It is seen that the cipher test differs significantly from the plain text message and the details of the enciphering must be known if the enciphered text is to be deciphered. Nonetheless, the cipher system illustrated in FIGS. 1A and 1B is relatively simple and a determined recipient can break the code, particularly if the general concept of the cipher system is known.

The most commonly used stream cipher employs a key generator. As shown in FIG. 2A for an encipherer and in FIG. 2B for a decipherer, both consist of an identical key generator 32. In the encipherer, a message arrives on an input line 34 and is added to the output of the key generator 32 in an adder 36 which in modulo 2 arithmetic is an exclusive OR gate. The output 38 of the adder 36 contains the cipher text. In the decipherer, the cipher text arriving on the input line 40 is differenced with the output of a key generator 32 in a subtractor 41. In the case of modulo 2 arithmetic, subtraction and addition are the same so that the sum of the two signals produces on the output 42 the original message. The key generator 32 present in both the encipherer and decipherer produces a sequence of bits independently of the contents of the message for the cipher text. However, the key generator 32 in each of the encipherer and decipherer must be producing the same sequence and be synchronized identically with the message. Security is maintained by maintaining the output of the key generator 32 in confidence. Its output is never transmitted in the clear.

Key generator ciphers have the advantage that if one bit of the cipher text is inverted because of a noisy path, the error is confined to a single bit of the deciphered message and does not propagate to other bits. However, the security provided by many key generator ciphers is considered insufficient.

A special case of a key generator cipherer is illustrated in FIG. 3. This system was proposed to operate with the National Bureau of Standards (NBS) Data Encryption Standard (DES). The DES system relies upon a 56-bit key 44. Both an input register 46 and an output register 48 are 64 bits wide. A DES circuit 50 takes the outputs of the key 44 and the input register 46, operating as a stream to block deserializer, and performs an algorithm on the block according to the Data Encryption Standard and outputs a 64 bit block to the output register 48. The output register 48 is also a shift register and its contents are shifted out as both a serial input 52 to the input register 46 and to an adder 54. The input 56 to the system is the other addend to the adder 54 which produces a signal on the output line 58. This structure is identical for both an encipherer and a decipherer for binary symbols. In the encipherer, the input line 56 carries the message while the output line 58 carries the cipher text. In a decipherer, the cipher text is on the input line 56 while the output line 58 carries the clear text message.

Similar circuitry has been applied to cipher-blocking chaining, as illustrated in FIGS. 4A and 4B for an encipherer and a decipherer respectively. The circuitry is similar to that in FIG. 3 except that in the encipherer, the input 60 to the input register 46 is connected to the output line 62 of the adder 54 so that the cipher text is inputted into the key generator. In the decipherer, the input line 64 to the input register 46 is connected to the input line 66 of the adder 54 so that the cipher text is inputted here as well. For the cipher systems of FIGS. 3 and 4, feedback is employed which is a function of the output of the DES circuit 50. The disadvantage of both methods is the complexity of the circuitry due to the requirement of both an input and an output register and the complexity of the DES algorithm itself. In fact, both methods are brute force techniques for converting a block cipher (DES) into a stream cipher and should not therefore be strictly considered as stream ciphers.

SUMMARY OF THE INVENTION

Accordingly, it is an object of this invention to provide a stream cipher system of high security.

It is another object of this invention to provide a cipher system using simple electronic components.

The invention can be summarized as a method of enciphering in which the message is added bit by bit to the output of a shift register and the sum forms the serial input to the same shift register. The parallel outputs of the shift register are transformed with a logic function to a single output which is then added to the message to form the cipher text.

BRIEF DESCRIPTION OF THE DRAWING

FIGS. 1A and 1B are schematic diagrams of auto-key ciphers of the prior art.

FIGS. 2A and 2B are schematic diagrams of stream ciphers of the prior art.

FIG. 3 is a schematic diagram of a key generator cipher of the prior art.

FIGS. 4A and 4B are schematic diagrams of blocked chaining ciphers of the prior art.

FIGS. 5A and 5B are schematic diagrams of an encipherer and a decipherer, respectively, of a first embodiment of the present invention.

FIGS. 6A and 6B are schematic diagrams of an encipherer and a decipherer, respectively, of a second embodiment of the present invention.

FIGS. 7A and 7B are schematic diagrams of an encipherer and a decipherer, respectively, of a third embodiment of the present invention.

FIGS. 8, 9, 10, 11 and 12 are schematic diagrams of embodiments of logic functions usuable with the present invention.

DETAILED DESCRIPTION OF THE PREFERRED EMBODIMENTS

Figure 9:
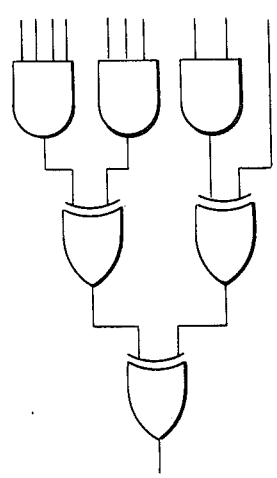

One embodiment of the invention is illustrated in block diagram form in FIG. 5A for an encipherer and FIG. 5B for a decipherer. In the encipherer, the plain text message is led in on an input line 64 to a first adder 66. The output 68 of the last bit of an l-bit shift register 70 is also led into the adder 66 and the sum is connected to the serial input 72 of the shift register 70. There is thus established an input feedback loop through the shift register 70. The l parallel outputs of the shift register 70 are all led to a logic function 74 which produces a single output 76. This single output 76 is then added to the current bit of the message on the input line 164 in a second adder 78 which produces on its output line 80 the desired cipher text.

The decipherer is arranged in a similar fashion but the cipher text on the input line 82 is subtracted from the output of the logic function 74 in a subtractor 84 to produce the deciphered message on its output line 86. The deciphered message is subtracted in a subtracter 88 from the output 90 of the last bit of the l-bit shift register 70. Once again, the l parallel outputs of the shift register 70 are led into the logic function 74. The subtractors 84 and 88 can be adders in binary systems.

The shift register 70 can be of any length l as determined by security requirements and system constraints. For all $2^l$ possible values of the shift register contents, the logic function 74 outputs one of n possible output symbols. In a binary system, n=2. The occurrence of each of the n possible symbols should be approximately equal, i.e. a particular output can be produced by approximately $2^l$ input combinations. Initially, the shift register of both the encipherer and decipher ;should be preset to a particular bit pattern, which is the cryptographic key of the system.

For a symbol size $n > 2$, $\log_2 n$ binary bits are required to represent the complete symbol set. In this general case, the shift register 70 may be considered as $\log_2 n$ binary shift registers, each having $l/\log_2 n$ bits. The adders 66 and 78 perform modulo-n addition while the adders 84 and 88 in the decipherer perform modulo-n subtraction.

It is seen that the cipher system of this invention incorporates features of both the auto-key cipher of FIGS. 1A and 1b and the feedback ciphers of FIGS. 3, 4A and 4B. It operates with a key initially inserted into the shift registers 70 in both the encipherer and decipherer without the need for a special key register 44. The invention provides higher security than the available with the auto-key cipher but without the hardware complexity associated with the DES ciphers of FIGS. 3, 4A and 4B.

A possible disadvantage of the cipher system of the invention is that if a single bit of the cipher text is inverted in transmission then, because of the feedback loop, the remaining or following text cannot be correctly deciphered. the error is not confined to a segment of the message. However, in some systems, such a propagating error is not a major problem. One such system incorporates error detection coding in the message. When an error is detected on the receiving side, the transmitting side is requested to retransmit the entire message regardless of whether one or multiple errors have been detected.

A further embodiment of the invention is shown for an encipherer in FIG. 6A and a decipherer n FIG. 6B. The shift register 70 of the encipherer of the previously described embodiment is divided into two shift registers 92 and 94. The output 72 of the adder 66 is led into the shift register 92 having l - m bits. The l - m parallel outputs of this shift register 92 are connected to a logic function 96 of similar but smaller construction to the logic function 74 and it has its one output 98 connected to the adder 78. The output 100 of the oldest bit in the shift register 92 is connected to the serial input of the shift register 94 having m bits. The output of this shift register 94 is connected to the adder 66, completing the feedback loop. In the decipherer, the output line 86 of the subtractor 84 is led into a subtractor 102 which also receives the output of the oldest bit of a shift register 104 having l - m bits. The output of the subtractor 102 is led into the serial input of an m-bit shift register 106, the output 108 of which is connected to the serial input of the shift register 104. Once again, the l - m parallel outputs of the shift register 104 are connected to the logic function 96 the output of which is connected to the subtractor 84. The logic function 96 associated with this embodiment is less complex because it does not process the m bits of the shift registers 94 and 104. However, the security strength of this embodiment of the cipher system is of course weaker than that of the previously described embodiment.

A third binary embodiment of the cipher system of the present invention is shown in FIG. 7A for the encipherer and in FIG. 7B for the decipherer. The structure of the encipherer very closely resembles the structure of the encipherer of the first embodiment shown in FIG. 7A except that an additional adder 110 is inserted into the output line 80 to add the output of the adder 78 and the newest bit in the shift register 70 of the encipherer. The output of the adder 112 carries the ciphered text for transmission. The additional adder 110 is intended to guarantee that a change of a single bit in the message 64 will have a high probability of changing the ciphered text on the output line 112. Although this requirement is usually borne by the logic function 74, it is difficult in some cases to build a logic function 74 fulfilling this requirement. The inclusion of the additional adder 112 requires that another adder 114 be included in the feedback loop of the encipherer that adds the newest bit in the shift register 70 to the feedback loop. Also required by this change is the inclusion of an adder 116 to the message output 86 of the decipherer at a point beyond its feedback to the adder/subtractor 88. The adder 116 also adds the newest bit in the shift register 70 to the output of the adder 84 to produce a plain text message on its output 118.

It is to be noted that the described embodiments have used adders in the encipher and subtractors in the decipherer. However, the invention includes cipher systems in which a subtractor in the encipherer is balanced by a corresponding adder in the decipher and vice versa. There may be an adder and subtractor within an encipherer if they are properly balanced in the decipherer. For purposes of this invention, an adder can add or subtract while a subtractor performs the opposite operation.

The logic functions 74 and 96 can be implemented in several ways. In general, a logic function can always be implemented by a read-only memory (ROM) having a $\log_2 n$-bit output for a symbol size of n. For the typical binary symbol set, only a single bit output is required. For l inputs to the ROM, $2^l$ storage locations are required for the binary symbol set. A ROM is advantageous in that its contents can be designed not only so that there are not only equal numbers of output symbols distributed among the address locations, but also so that their distribution is such that it is virtually impossible to derive its contents by investigating only a sequence of its outputs. The method of establishing a nearly optimal relationship between the inputs to the logic function and its output within a chosen logic function structure relies on standard statistical techniques.

The disadvantage of using a single ROM as the logic function is that its size increases exponentially with the number of input lines so that the implementation becomes too complicated for larger values of l. The second embodiment of the cipher system illustrated in FIGS. 6A and 6B reduces the complexity of the ROM but only at the expense of weaker security.

Figure 10:
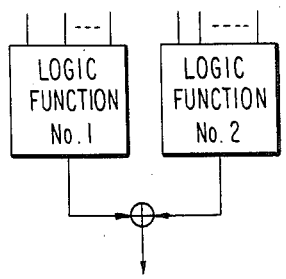
Figure 11:
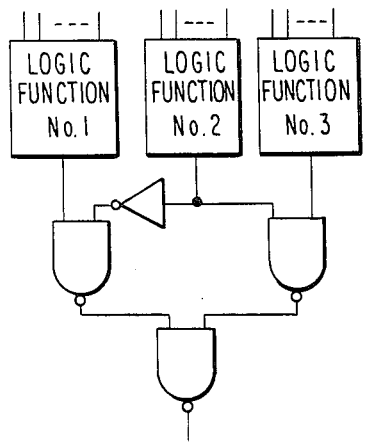
Figure 12:
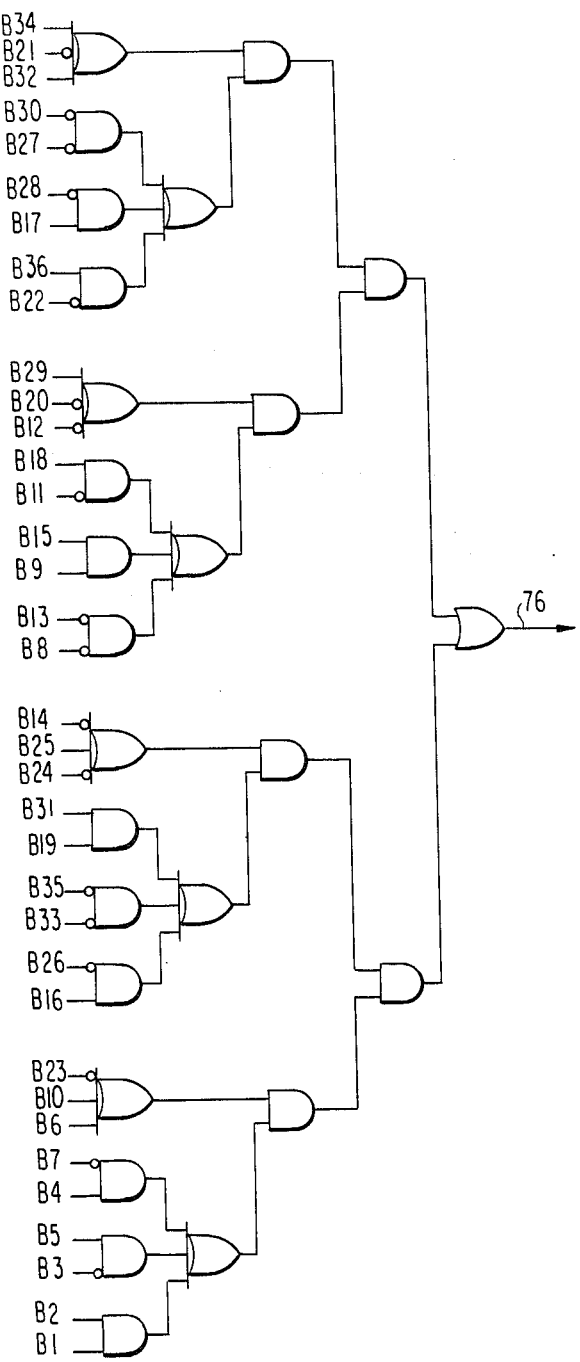

A generalized method for reducing the size of individual logic functions is illustrated in FIG. 8 for a two-stage transformation logic. The l inputs are divided in $k_2$ inputs to $k_l$ similar logic functions 120, 122 and 124 where $l=k_1 \cdot k_2$. The $k_1$ outputs of the logic functions 120, 122 and 124 of the first stage are led into the $k_1$ inputs of a second stage logic function 126 that produces the one desired output 128. The logic functions 120–126 can be either ROMs or other types of gate circuits. Examples of multi-stage logic functions are shown in FIGS. 9, 10 and 11. It should be noted that the logic circuit of FIG. 9 is the sum of one direct input 130 and the output of various multiple input gates. Such a design guarantees an equal distribution of the output symbols over the various combinations of input signals. A more realistic logic function implemented with gates is shown in FIG. 12 in which 36 input lines are combined in various AND gates and OR gates to form a single output. The designations on the pin inputs refer to the bit numbers on the shift register 70. The connection of the first stage inputs to the output of the shifter register in the various embodiments of the cipher system should be chosen so that the output of the overall transformation appears random. Some general guidelines are that contiguous outputs of the shift register should be connected to different sections of the input stage of the logic function. Furthermore, the connections between the shift register and the logic function should appear random and neighboring inputs to the logic function should not be connected to equally spaced outputs of the shift register.

It is believed that the security provided by any multi-stage logic function is necessarily less than that obtainable by a single ROM. It is thus for a multi-stage transformation logic that the third embodiment of the cipher system of FIGS. 7A and 7B is most needed.

The present invention is superior to known prior cipher systems in that it provides strong security and creates more confusion for cryptanalysis while using fairly simple circuitry. The more secure embodiments of the invention use a large number of inputs to the logic function and rely less upon a multi-stage logic function.

We claim:

1. An enciphering method, comprising the steps of:
   inputting a key into a shift register;
   serially adding bit by bit the serial output of said shift register and a message to be enciphered to produce a sum;
   inputting the sum into the serial input of said shift register;
   shifting said shift register in synchronism with said message;
   performing a logic operation upon a plurality of parallel outputs of said shift register to produce a logic operation output, the value of said logic operation output being divided among predetermined values substantially equally distributed over all possible combinations of the values of the parallel outputs of said shift register; and
   serially adding said logic operation output to said message to form a second sum, whereby the second sum is an enciphered text.

2. An enciphering method as recited in claim 1, further comprising the step of adding one of said outputs of said shift register to the sum of the message and the logic operation output to form a further sum, whereby the further sum is an enciphered text.

3. A deciphering method, comprising the steps of:
   inputting a key into a shift register;
   serially subtracting bit by bit a serial output of said shift register from a deciphered message to form a difference;
   inputting the difference into a serial input of said shift register;
   shifting said shift register in synchronism with said message;
   performing a logic operation upon a plurality of parallel outputs of said shift register to produce an output, a value of said logic operation output being divided among predetermined values substantially equally distributed over all possible combinations of the values of the parallel outputs of said shift register; and
   serially subtracting said logic operation output from an enciphered text to form a second difference, whereby the second difference is said deciphered message.

4. An encipher, comprising:
a shift register;
a single-bit first adder connected to an output of said shift register and a line containing a message to be enciphered, the output of said first adder being connected to a serial input of said shift register;
a logic function connected to a plurality of parallel outputs of said shift register for transforming said parallel outputs to a logic function output, the values of which are substantially equally distributed over the possible combinations of values of said shift register parallel outputs; and
a single-bit second adder connected to said logic function output and said message line to form a serial sum, whereby said serial sum is an enciphered message.

5. A encipherer as recited in claim 4, further comprising a third adder connected to the output of said second adder and one of said parallel outputs of said shift register.

6. A decipherer, comprising:
a shift register;
a single-bit first subtractor connected to an output of said shift register and a line containing a deciphered message, an output of said first subtractor being connected to a serial input of said shift register;
a logic function connected to a plurality of parallel outputs of said shift register for transforming said parallel outputs to a logic function output, the values of which are substantially equally distributed over the possible combinations of values of said shift register parallel outputs; and
a single-bit second subtractor connected to said logic function output and a message line containing an enciphered message to form a serial difference, a message output of said second subtractor being connected to said deciphered message line.

7. A method of enciphering a message signal comprising a series of message bits having a bit period, said method comprising the steps of:
serially combining bit by bit said message signal (64) with a delayed first signal (68) to obtain a second signal (72);
delaying said second signal by a first predetermined number (l) of bit periods to obtain said delayed first signal;
delaying said second signal by a plurality of different delay periods to obtain a plurality of third signals, each of said plurality of different delay periods comprising a number of bit periods no greater than said first predetermined number;
performing a logic operation upon said third signals to produce a fourth signal, the value of said fourth signal being divided among predetermined values substantially equally distributed over all possible combinations of the values of said third signals; and
serially combining bit by bit said fourth signal with said message signal to produce a cipher text (58).

8. A enciphering method, as recited in claim 7, further comprising the step of setting said second signal to a predetermined value at the commencement of an enciphering operation.

9. An enciphering method, as recited in claim 7, wherein said step of combining said message signals with said second signal comprises adding said message signal bit-by-bit to said second signal.

10. An enciphering method, as recited in claim 7, wherein said step of combining said fourth signal with said message signal comprises adding said fourth signal bit-by-bit to said message signal.

11. An enciphering method, as recited in claim 7, wherein said bit values of said fourth signals are substantially equally distributed over all possible combinations of said third signals.

* * * * *